(12) United States Patent
Krishna et al.

(10) Patent No.: US 6,971,006 B2
(45) Date of Patent: Nov. 29, 2005

(54) SECURITY CHIP ARCHITECTURE AND IMPLEMENTATIONS FOR CRYPTOGRAPHY ACCELERATION

(75) Inventors: Suresh Krishna, Sunnyvale, CA (US); Christopher Owen, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 192 days.

(21) Appl. No.: 10/227,491

(22) Filed: Aug. 23, 2002

(65) Prior Publication Data

US 2002/0199101 A1    Dec. 26, 2002

Related U.S. Application Data

(63) Continuation of application No. 09/510,486, filed on Feb. 23, 2000, now Pat. No. 6,477,645.

(60) Provisional application No. 60/159,012, filed on Oct. 12, 1999, provisional application No. 60/142,870, filed on Jul. 8, 1999.

(51) Int. Cl.[7] ............................................... H04L 9/00
(52) U.S. Cl. ..................... 713/161; 713/181; 713/189
(58) Field of Search ................................ 713/160–162, 713/181, 189–190, 194, 200–201; 380/212, 380/217, 277, 282, 285; 709/235, 238–240; 370/394, 395.1

(56) References Cited

U.S. PATENT DOCUMENTS

| 5,185,796 A | * | 2/1993 | Wilson ........................ 380/277 |
| 5,297,206 A | | 3/1994 | Orton |
| 5,691,997 A | * | 11/1997 | Lackey, Jr. .................. 714/807 |
| 5,737,334 A | * | 4/1998 | Prince et al. ........... 370/395.53 |
| 5,796,836 A | | 8/1998 | Markham |
| 5,870,474 A | | 2/1999 | Wasilewski et al. |
| 5,936,967 A | | 8/1999 | Baldwin et al. |
| 5,943,338 A | | 8/1999 | Duclos et al. |
| 6,111,858 A | | 8/2000 | Greaves et al. |
| 6,134,246 A | * | 10/2000 | Cai et al. .................... 370/474 |
| 6,216,167 B1 | | 4/2001 | Momirov |
| 6,295,604 B1 | * | 9/2001 | Callum ....................... 713/160 |
| 6,667,984 B1 | * | 12/2003 | Chao et al. ................. 370/414 |

FOREIGN PATENT DOCUMENTS

WO    WO 01/80483    10/2001    ............. H04L 9/32

OTHER PUBLICATIONS

"Applied Cryptography, Second Edition", Schneider, B., 1996, John Wiley & Sons, New York, XP002184521, cited in the application, p. 442, paragraph 18.7—p. 445.

(Continued)

*Primary Examiner*—Hosuk Song
(74) *Attorney, Agent, or Firm*—Christie, Parker & Hale, LLP

(57) ABSTRACT

An architecture and a method for a cryptography acceleration is disclosed that allows significant performance improvements without the use of external memory. Specifically, the chip architecture enables "cell-based" processing of random-length IP packets. The IP packets, which may be of variable and unknown size, are split into fixed-size "cells." The fixed-sized cells are then processed and reassembled into packets. The cell-based packet processing architecture of the present invention allows the implementation of a processing pipeline that has known processing throughput and timing characteristics, thus making it possible to fetch and process the cells in a predictable time frame. The architecture is scalable and is also independent of the type of cryptography performed. The cells may be fetched ahead of time (pre-fetched) and the pipeline may be staged in such a manner that attached (local) memory is not required to store packet data or control parameters.

30 Claims, 11 Drawing Sheets

OTHER PUBLICATIONS

"SHA: The Secure Hash Algorithm Putting Message Digests to Work", Stallings, W., Dr. Dobbs Journal, Redwood City, CA, Apr. 1, 1994, p. 32-34, XP000570561.

R. Sedgewick, "Algorithms in C—Third Edition," 1998, Addison Wesley, pp. 573-608.

"Secure Products VMS115", VLSI Technology, Inc., Printed in USA, Document Control: VMS115, VI, 0, Jan. 1999, pp. 1-2.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84. Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "DEFLATE Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications", BlueSteel Networks, Inc., Sep. 8, 1999, pp. 1-10.

Analog Devices: "ADSP2141 SafeNetDPS User's Manual, Revision 6", Analog Devices Technical Specifications, Mar. 2000, XP002163401, 87 Pages.

C. Madson, R. Glenn: "RFC 2403- The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 Pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

* cited by examiner

SECURITY CHIP ARCHITECTURE AND IMPLEMENTATIONS FOR CRYPTOGRAPHY ACCELERATION

This application is a continuation of and claims priority from U.S. patent application Ser. No. 09/510,486 entitled Security Chip Architecture And Implementations For Cryptography Acceleration filed on Feb. 23, 2000 now U.S. Pat. No. 6,477,645, which claims priority from both U.S. Provisional Application No. 60/142,870, entitled Networking Security Chip Architecture And Implementations For Cryptography Acceleration filed Jul. 8, 1999 and U.S. Provisional Application No. 60/159,012, entitled Ubiquitous Broadband Security Chip, filed Oct. 12, 1999, the disclosures of which are herein incorporated by reference.

BACKGROUND OF THE INVENTION

1. Field of the Invention

The present invention relates generally to the field of cryptography, and more particularly to an architecture and method for cryptography acceleration.

2. Description of the Related Art

Many methods to perform cryptography are well known in the art and are discussed, for example, in *Applied Cryptography*, Bruce Schneier, John Wiley & Sons, Inc. (1996, 2$^{nd}$ Edition), herein incorporated by reference. In order to improve the speed of cryptography processing, specialized cryptography accelerator chips have been developed. For example, the Hi/fn™ 7751 and the VLSI™ VMS115 chips provide hardware cryptography acceleration that out-performs similar software implementations. Cryptography accelerator chips may be included in routers or gateways, for example, in order to provide automatic IP packet encryption/decryption. By embedding cryptography functionality in network hardware, both system performance and data security are enhanced.

However, these chips require sizeable external attached memory in order to operate. The VLSI VMS118 chip, in fact, requires attached synchronous SRAM, which is the most expensive type of memory. The additional memory requirements make these solutions unacceptable in terms of cost versus performance for many applications.

Also, the actual sustained performance of these chips is much less than peak throughput that the internal cryptography engines (or "crypto engines") can sustain. One reason for this is that the chips have a long "context" change time. In other words, if the cryptography keys and associated data need to be changed on a packet-by-packet basis, the prior art chips must swap out the current context and load a new context, which reduces the throughput. The new context must generally be externally loaded from software, and for many applications, such as routers and gateways that aggregate bandwidth from multiple connections, changing contexts is a very frequent task.

Recently, an industry security standard has been proposed that combines both "DES/3DES" encryption with "MD5/SHA1" authentication, and is known as "IPSec." By incorporating both encryption and authentication functionality in a single accelerator chip, over-all system performance can be enhanced. But due to the limitations noted above, the prior art solutions do not provide adequate performance at a reasonable cost.

Thus it would be desirable to have a cryptography accelerator chip architecture that is capable of implementing the IPSec specification (or any other cryptography standard), that does not require external memory, and that can change context information quickly.

SUMMARY OF THE INVENTION

In general, the present invention provides an architecture for a cryptography accelerator chip that allows significant performance improvements over previous prior art designs. Specifically, the chip architecture enables "cell-based" processing of random-length IP packets. The IP packets, which may be of variable and unknown size, are split into smaller fixed-size "cells." The fixed-sized cells are then processed and reassembled into packets. For example, the incoming IP packets may be split into 64-byte cells for processing.

The cell-based packet processing architecture of the present invention allows the implementation of a processing pipeline that has known processing throughput and timing characteristics, thus making it possible to fetch and process the cells in a predictable time frame. The present architecture is scalable and is also independent of the type of cryptography performed. In preferred embodiments, the cells may be fetched ahead of time (pre-fetched) and the pipeline may be staged in such a manner that attached (local) memory is not required to store packet data or control parameters.

In a first embodiment, an IPSec processing chip may be implemented by having 3DES-CBC and MD5/SHA1 processing blocks. The processing of the cells is pipelined and the sequencing is controlled by a programmable microcontroller. In a second embodiment, Diffie-Hellman or RSA and DSA public key processing may be added as well. Additional processing blocks may be implemented as well. The present invention provides a performance improvement over the prior art designs, without requiring any additional external memory.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
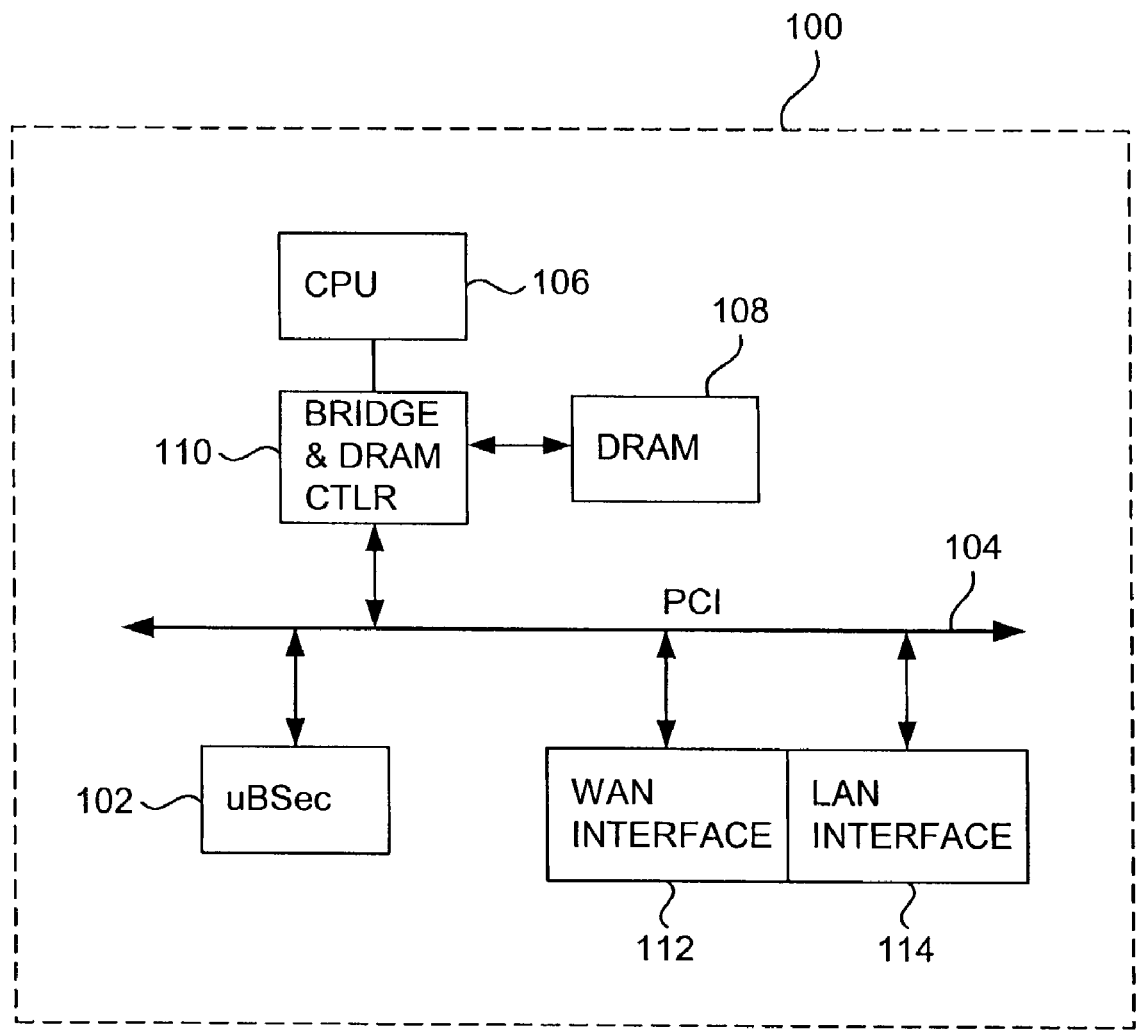
FIG. 1 is a high-level block diagram of a system implementing a cryptography accelerator chip according to the present invention.

The following description is provided to enable any person skilled in the art to make and use the invention and sets forth the best modes contemplated by the inventors for carrying out the invention. Various modifications, however, will remain readily apparent to those skilled in the art, since the basic principles of the present invention have been defined herein specifically to provide an architecture and method for cryptography acceleration.

In general, the present invention provides an architecture for a cryptography accelerator chip that allows significant performance improvements over previous prior art designs. Specifically, the chip architecture enables "cell-based" processing of random-length IP packets. Cell-based packet processing involves the splitting of IP packets, which may be of variable and unknown size, into smaller fixed-size "cells." The fixed-sized cells are then processed and reassembled (recombined) into packets. For example, the incoming IP packets may be split into 64-byte cells for processing. The cell-based packet processing architecture of the present invention allows the implementation of a processing pipeline that has known processing throughput and timing characteristics, thus making it possible to fetch and process the cells in a predictable time frame. In preferred embodiments, the cells may be fetched ahead of time (pre-fetched) and the pipeline may be staged in such a manner that attached (local) memory is not required to store packet data or control parameters.

At present, the other known solutions in the industry use a completely different architecture that relies on having local, attached memory to hold context information, packet data or both, depending on the architecture. Thus, the prior-art designs require an external block of memory very close to the chip. The present invention does not require external memory due to the highly pipelined design that breaks up packets into fixed-sized cells. Because the cells are of a fixed size, the present invention can pre-fetch the fixed-sized cells ahead of time before processing.

The size of memory required on an accelerator chip that is constructed according to the present invention is substantially less than the memory required for other solutions. The present invention only needs enough memory on chip to store a few 64-byte cells, context information, keys, etc for two or more packets, and is able to sustain full performance for any packet size and any number of contexts. The prior art solutions require sufficient memory to hold the context for several hundred to several thousand different packets, plus enough memory to hold the packet data as well.

The cell based pipeline mechanism of the present invention is driven by a programmable control processor, which is responsible for sequencing the flow of packets as well as control information through the set of processing units. The control processor determines at any given time how packets are split up into fixed sized cells, and when the cells should be read from the bus into the on-chip cell memory. The processor also pre-fetches context information that describes what processing needs to be applied to the packets. The control processor then sequences the computational units (crypto, authentication, compression, etc.) to apply the specific algorithms specified in the context information to the cells that have been previously fetched. The control processor also writes out the processed result in cell size "chunks." Furthermore, the present invention supports a mode in which consecutive back-to-back packets can use different keys and different cryptographic formats without any loss of performance because the context and the packet data are pre-fetched.

In standard networks, IP packets can be of variable size, anywhere from 1 to $2^{16}$ bytes, although in practice most packets are between 64 and 8 k bytes. According to an embodiment of the present invention, the variable-length packets are split into standard 64-byte cells, although other implementations may use a different fixed-size for each cell. The present invention relies on the control processor to efficiently sequence the cell processing. For example, if there are many large packets back-to-back, the control processor focuses on processing the current packet as quickly as possible, but if there are some small packets queued up, it will emphasize the pre-fetch of the control information, since this will be the likely processing bottleneck.

Under certain circumstances, the processor may decide not to pre-fetch the next set of context and key information, and in certain cases it will pre-fetch this information. For example, the processor may decide not to pre-fetch under the following two scenarios:

1) if the system bus is currently heavily loaded with processing data from the current packet (such as writing back processed cells ), the control processor would delay any further pre-fetch requests to avoid overloading the system bus, until the system bus is available;

2) if the control processor itself is busy processing control information for the current packet, such as fetching new cells for the current packet, then the control processor will delay the pre-fetch of the next set of packets and associated control information.

Since the control processor can be programmed via microcode instructions, the architecture can be implemented in a relatively small die size relative to the performance levels that can be achieved, which is a big advantage over competing solutions. The architecture of the present invention is also independent of the type of crypto engines used, and therefore new algorithms can be supported simply be adding additional crypto blocks.

As shown in FIG. 1, the present invention may be implemented as a stand-alone cryptography accelerator chip 102 and incorporated into a standard processing system 100. The cryptography accelerator chip 102 may be connected to a standard PCI bus 104 via a standard on-chip PCI interface. The processing system 100 includes a processing unit 106 and a system memory unit 108. The processing unit 106 and the system memory unit 108 may be attached to the system bus 104 via a bridge and memory controller 110. A LAN interface 114 attaches the processing system 100 to a local area network and receives packets for processing and writes out processed packets to the network. Likewise, a WAN interface 112 connects the processing system to a WAN, such as the Internet, and manages in-bound and out-bound packets, providing automatic security processing for IP packets.

Figure 2:
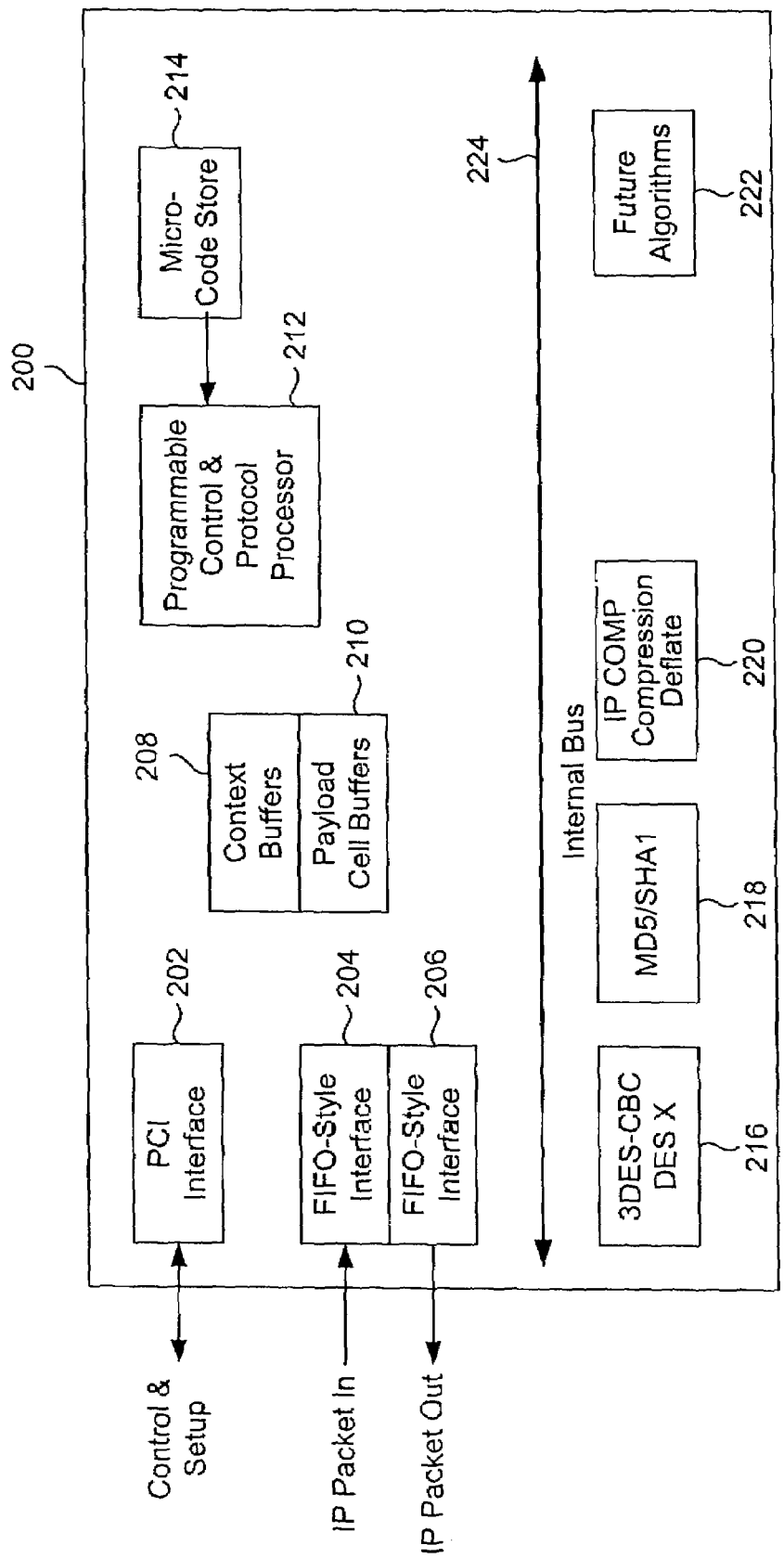
FIG. 2 is a high-level block diagram of a cryptography accelerator chip of the present invention.

FIG. 2 is a high-level block diagram of the cryptography chip architecture of the present invention. A standard PCI interface 202 provides a standard interface for connecting the chip 200 to external systems. According to this embodiment, the PCI bus is a 32-bit bus operating at up to 33 MHz. Of course, other interfaces and configurations may be used, as is well known in the art, without departing from the scope of the present invention. The IP packets are read into a FIFO (First In First Out buffer) 204, where the random-length packets are split into fixed-sized cells. The fixed-sized cells are then stored in payload cell buffers 210 via the internal bus 224. Context buffers 208 store "context" information for the associated fixed-sized cells, such as encryption keys, data, etc. A programmable processor 212 controls the sequencing and processing of the fixed-sized cells, and optimizes the pipelined processing. The processor 212 is programmed via on-chip microcode stored in a microcode storage unit 214.

The fixed-sized cells are then processed in a pipelined fashion by one of the "crypto" engines. For example, the crypto engines may include "3DES-CBC/DES X" encryption/decryption 216, "MD5/SHA1" authentication/digital signature processing 218, and compression/decompression processing 220. Note that the present architecture is independent of the types of cryptography processing performed, and additional crypto engines may be incorporated to support other current or future cryptography algorithms 222. The output cells are then stored in an output FIFO 206, in order to write the packets back out to the system via the PCI bus.

Figure 3:
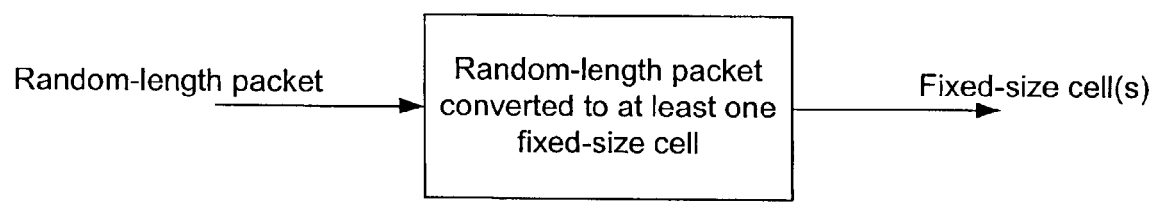
FIG. 3 is a diagram illustrating the conversion of a random-length packet to a fixed-size cell, as disclosed by the present invention.

As previously discussed, the present architecture converts random-length packets into fixed-sized cells, in order to facilitate pipelined processing. This conversion is illustrated in FIG. 3. Once a random-length IP packet is obtained from the system, the packet is converted into a plurality of fixed-size cells (or one cell if the packet is smaller than the standard fixed-sized cell). Since the cells have a uniform size, the processing flow can be designed to maximize the throughput of the system by incorporating pipelining design techniques, such as pre-fetching. If an IP packet is less than the standard fixed-sized cell, the packet is converted into a single fixed-sized cell and processed. The step of "recombining" in this case simply comprises converting the single cell back to an IP packet.

Figure 4:
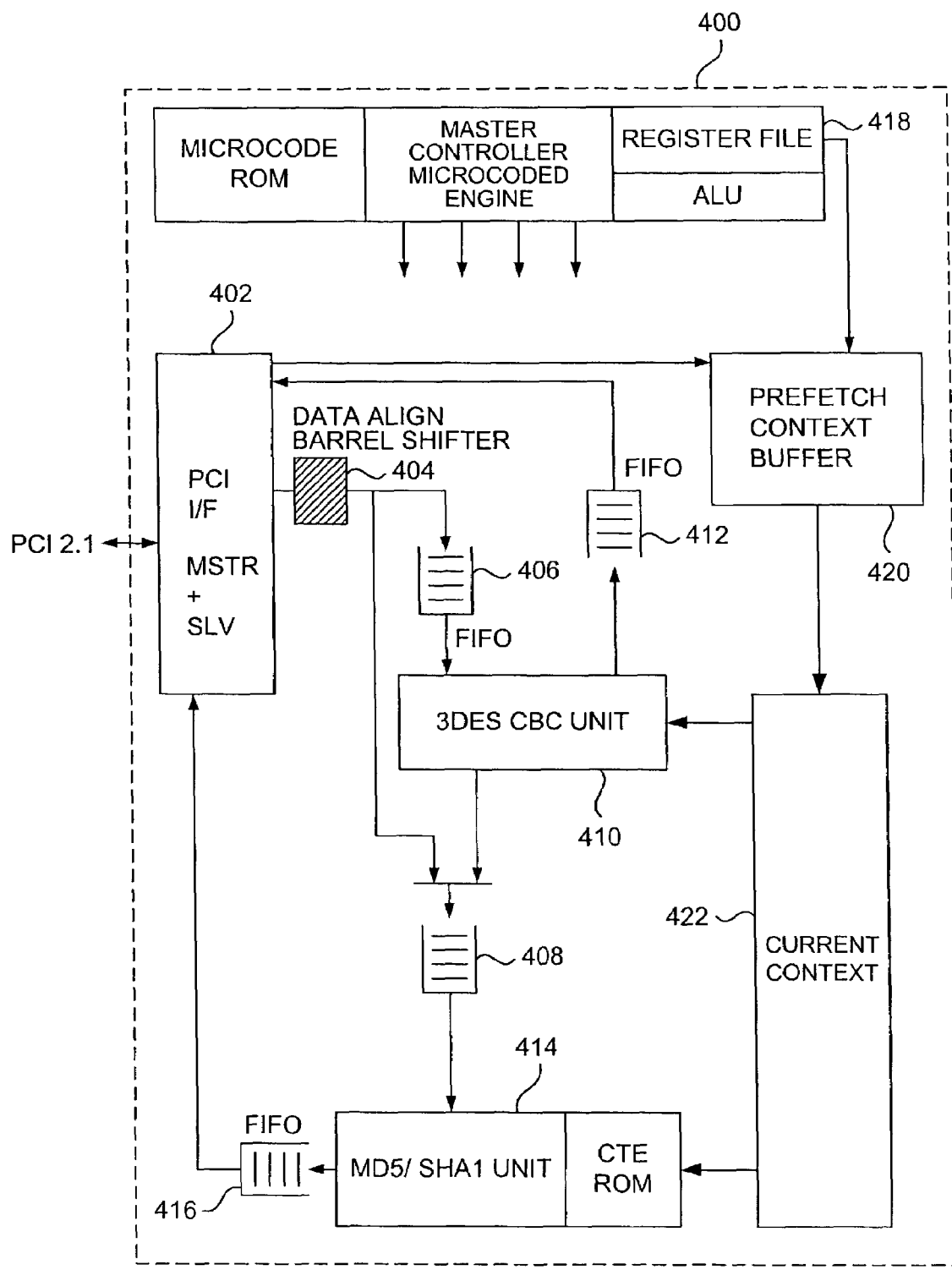
FIG. 4 is a block diagram of a cryptography accelerator chip configured according to a first embodiment of the present invention.

A first embodiment of the present invention is shown in more detail in FIG. 4. An IPSec cryptography accelerator chip 400 constructed according to the present invention reads and writes data to the system via a PCI interface 402. Each incoming packet is sub-divided into fixed-size cells by a data align barrel shifter 404, wherein each cell in this implementation is 64 bytes. The data align barrel shifter 404 serves as a packet splitting unit to divide the incoming packets into fixed-sized cells. The input packets may also be scattered all over memory (i.e. fragmentation), and the data align barrel shifter unit 404 reassembles those pieces and produces as output fixed size 64 byte cells.

The size of each cell may be larger or smaller, depending on the cost and performance requirements for a given implementation. Also, other techniques may be used to sub-divide the incoming packets, as are well known in the art, without departing from the scope of the present invention. The choice of 64-byte fixed-sized cells is a design trade-off between the amount of memory needed on chip and the higher the performance that can be achieved with larger sized cells. For current cost versus performance, a 64-byte cell size is a good trade-off. Also, a 64-byte cell size is a good match for the size requirements for some of the crypto algorithms, particularly MD5/SHA1, which prefers to see 64-byte "chunks" of data.

As an incoming packet is sub-divided, the fixed-sized cells are stored in FIFO buffers 406, 408 waiting for processing by the crypto engines 410, 414. Context information needed to process the current packet is also read in and stored in the pre-fetch context buffer 420. This implementation is designed to provide industry-standard IETF IPSec encryption and authentication acceleration and therefore only includes two crypto engines. A "3DES-CBC" unit 410 is included for providing encryption and decryption of incoming packets and a "MD5/SHA1" unit 414 provides authentication and digital signature processing. For in-bound packets, the cells are first authenticated and then decrypted in parallel fashion. For out-bound packets, the cells are first encrypted then authenticated, again in pipelined fashion. The processing units 410, 414 processes the cells in the FIFOs 406, 408 using the current packet context information stored in the current context buffer 422.

The outputs of the processing units 410, 414 are stored in output FIFOs 412, 416 until the data can be written back out to system memory via the PCI interface 402. The sequencing of the data processing and pre-fetching is controlled by the microcontroller 418, and the program code (described below) ensures that the crypto engines are continually provided with cells and context information. Since the crypto units do not have to wait while entire packets of varying sizes are read in from system memory, this procedure increases the throughput of the chip, as compared to the prior art designs. For this basic design with an internal clock speed of 60 MHz, the engine throughput is about 195 Mb/s with 3DES encryption and MD5/SHA1 authentication enabled.

This implementation is suitable for a variety of cost-sensitive applications, such as cable modems, xDSL devices, security gateways, and PC-based security accelerators. Since the present invention does not require any external memory, the cost is much lower than competing designs that require external memory. Also, testing has shown that full performance can be maintained independent of any reasonable PCI bus latency or clock frequency, since the data is pre-fetched well before it is needed for internal processing.

The interface between the cryptography accelerator chip and the host CPU software provides autonomous chip operation via an intelligent, descriptor-based DMA interface that minimizes the software-processing load. Specifically, packet data copying is avoided under all conditions. Input packet fragmentation is supported (at an IP level as well as in terms of memory allocation for the packet data) and the input fragments can be of any size (down to one byte), and can be aligned on any byte boundary. Output packet fragmentation (at an IP level as well as in terms of memory allocation for packet data) is also supported. The output fragment size can be controlled in one of two configurable ways: through a length field with each output data descriptor, or through a global output data buffer length field. This provides the flexibility of using a fixed output fragment size, or of setting fragment size on a per-packet basis. In the present embodiment, output fragments must be aligned on 32-bit word boundaries, and must be multiples of a 32-bit word in size.

The host CPU queues up any number of packets in system memory, and passes a pointer to a master command structure that identifies these packets to the accelerator chip. The master command record is used to hand off a number of packets to the chip for processing. The structure is variable-length, and contains up to $2^{16}-1$ sets of fields, wherein each field describes one packet. This degree of flexibility allows the host CPU to queue up any number of packets, and to initiate hardware processing of all the queued packets via a single PCI write. The accelerator chip then processes all the packets as specified, returns status information to the CPU via a "done" flag, and if enabled, via an interrupt per packet, or upon global completion of all packets within a master command structure.

A unique processing context structure is associated with each packet in the master command record, which allows various packets to be processed differently even though they are all part of a common master command structure. In addition, data from each packet can be fragmented on input ("gather" function support) and on output ("scatter" function support).

Figure 5:
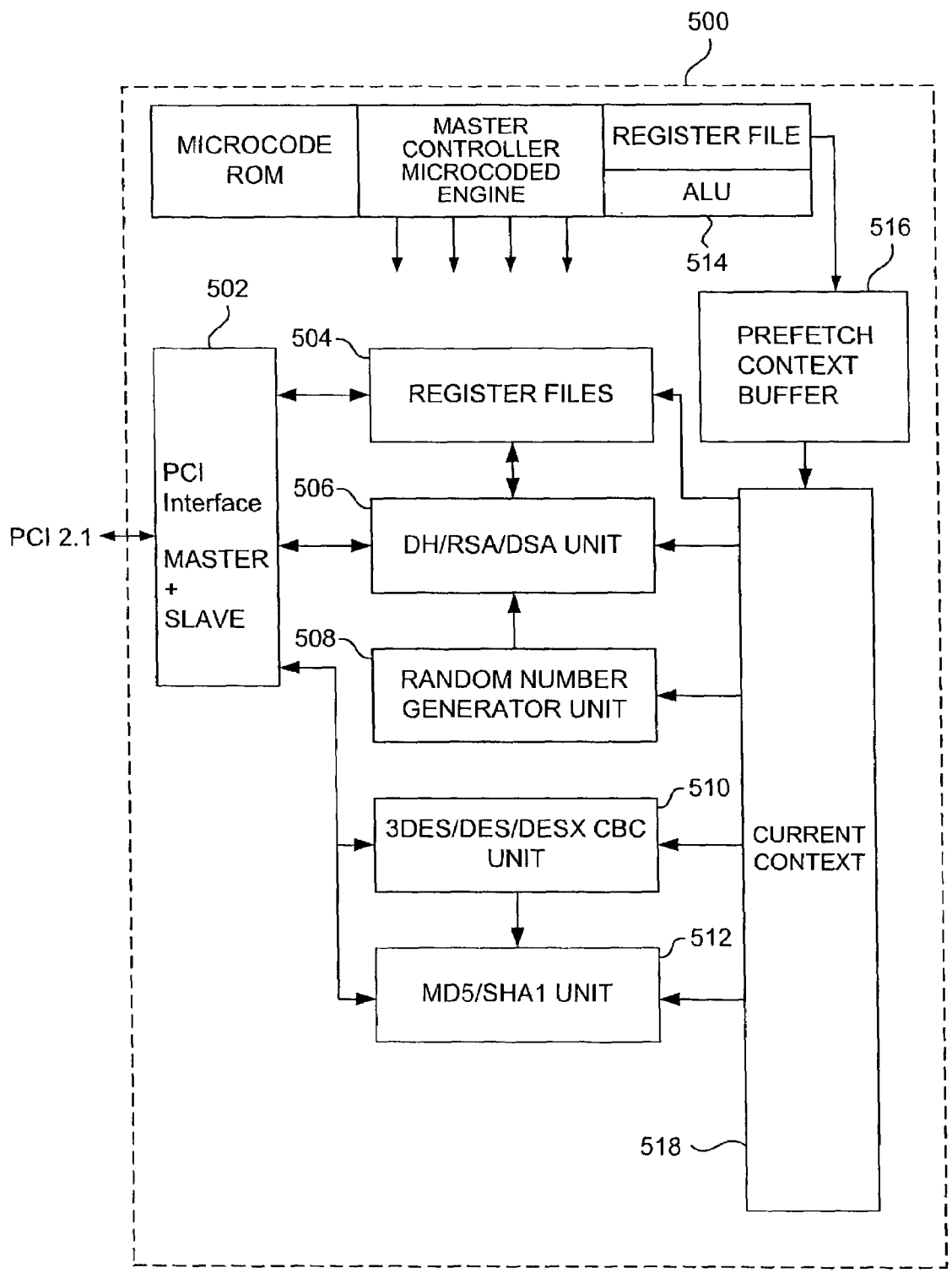
FIG. 5 is a block diagram of a cryptography accelerator chip configured according to a second embodiment of the present invention.

A second embodiment of the present invention is illustrated in FIG. 5. This embodiment is similar to the embodiment of FIG. 4, except that it also includes a DH(Diffie-Hellman)/RSA/DSA unit 506, and a random number generator unit 508 to facilitate the public key processing. With an internal clock of 75 MHz, the engine throughput in this embodiment is over 400 Mb/s, with 3DES encryption and MD5/SHA1 authentication enabled. In this embodiment the PCI bus is a 64-bit bus operating at up to 66 MHz. Note that the speed of the PCI bus clock (33 MHz vs. 66 MHz) and the bus latency have very little effect on the performance of the present invention, since the accelerator chips aggressively pre-fetch and write back descriptors, command buffers, context parameters and packet data. This enables the accelerator chips to run the crypto and authentication engines at full potential despite other system latencies.

The key setup execution unit 506 accelerates the public key operations and the random number generator unit 508 generates secure private keys. Additionally, a register block 504 has 1024-bit register files to hold the large public key data used in public key processing. Although not shown in FIG. 5, this embodiment includes the FIFOs and the data align barrel shifter described with reference to FIG. 4. In addition to the crypto units shown, any other current or future algorithms may be supported using similar techniques.

The embodiment of FIG. 5 generates SSL session keys using RSA in the following stages:

1. fetch the command context including keys and message through DMA
2. if the required operation is private key encryption, use the private key RSA algorithm with pre-computed components generated using the Chinese Remainder Theorem
3. if the required operation is public key encryption, use the public RSA algorithm
4. write the decrypted/encrypted message to the output buffer.

Alternatively, the second embodiment generates keys using the Diffie-Hellman algorithm for an IPSec session during IKE handshake according to the following stages:

1. fetch the command context and message through DMA
2. if the required operation is to generate a message to another party ($g^x$ mod n), generate a 180-bit random number from the random number generator unit 508 and then perform the modular exponentiation with the generated random number as the exponent
3. if the required operation is to generate the shared key from the message received ($Y^x$ mod n), perform the modular exponentiation with a previously generated random number (the random number will be a part of the command context through the DMA)
4. write the output including the random number, if applicable, to the output buffer.

Authentication using DSA algorithm for an IPSec session during IKE handshake is preformed in the following stages:

1. fetch the command context and message through DMA
2. if the required operation is to sign a message, generate a random number and compute "r" and "s" values using the SHA1 512 and key setup 506 execution units
3. if the required operation is to verify a signature, compute "v" value using SHA1 512 and key setup 506 execution units
4. write the output to the output buffer.

Figure 6:
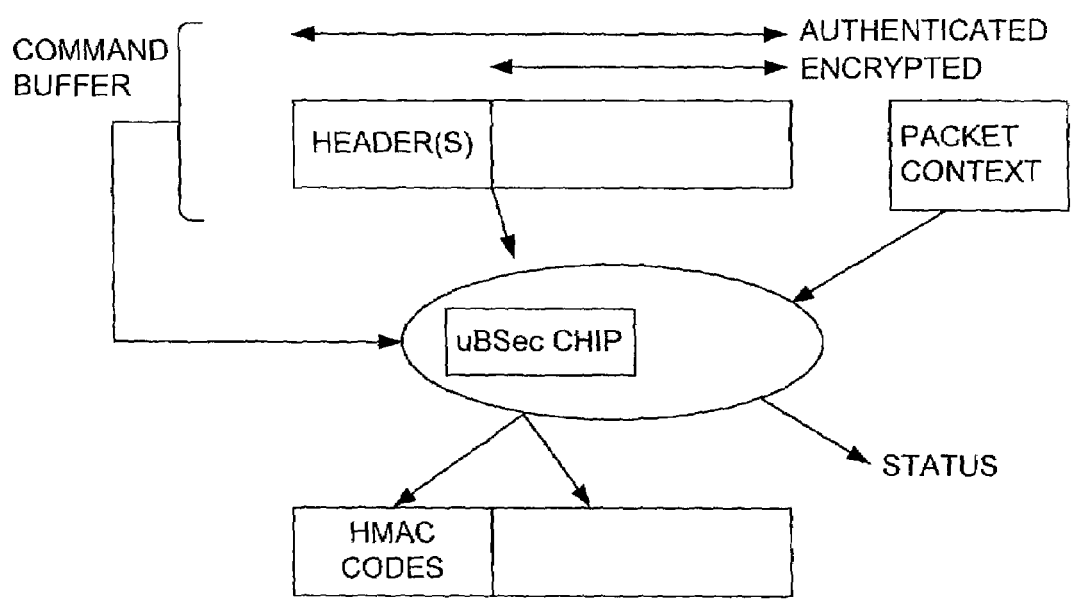
FIG. 6 is a block diagram illustrating the packet processing of the present invention.
Figure 7A:
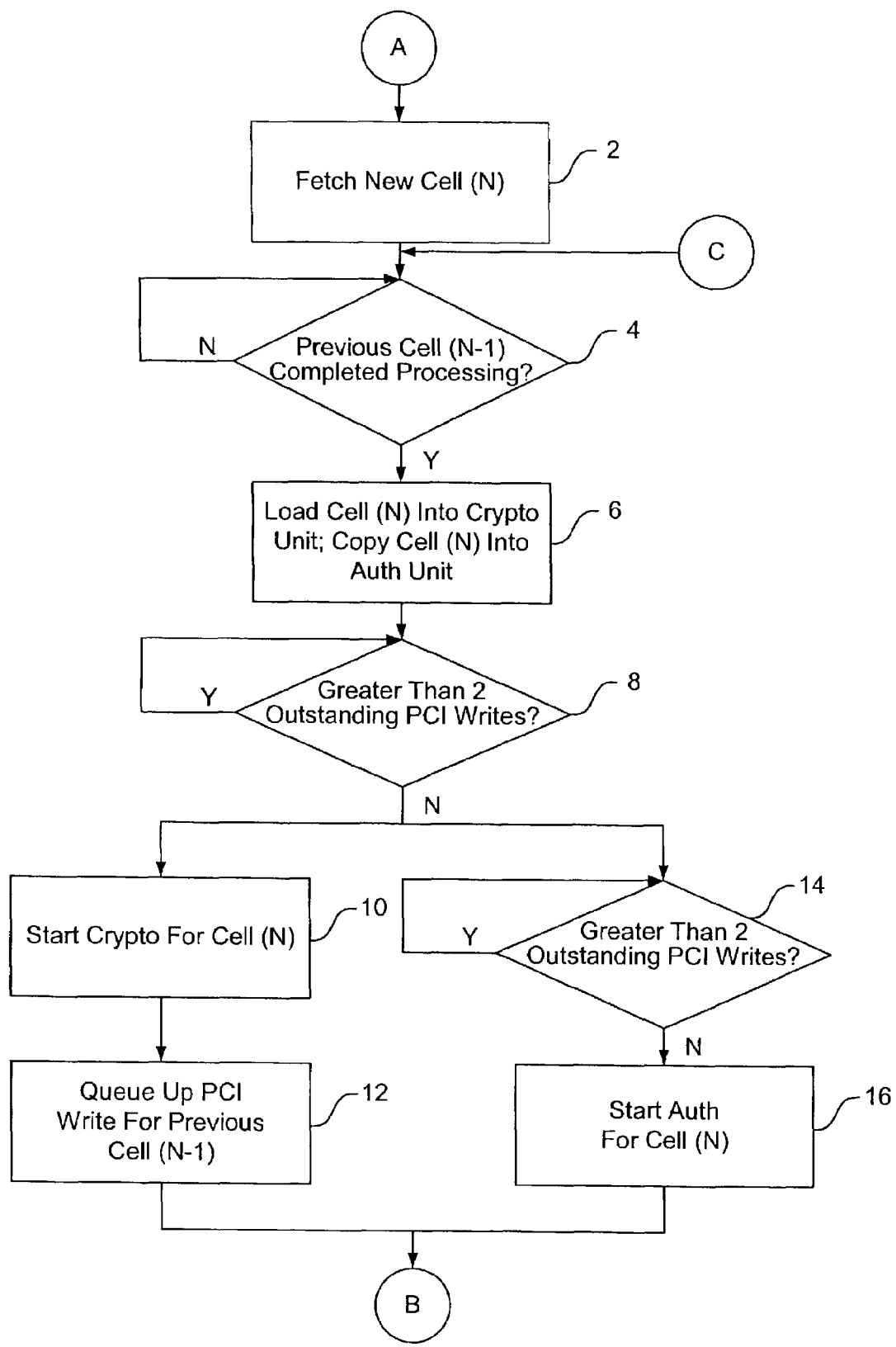
FIGS. 7(A)–7(D) are flowcharts illustrating one embodiment of the packet sequencing procedure of the present invention.
Figure 7B:
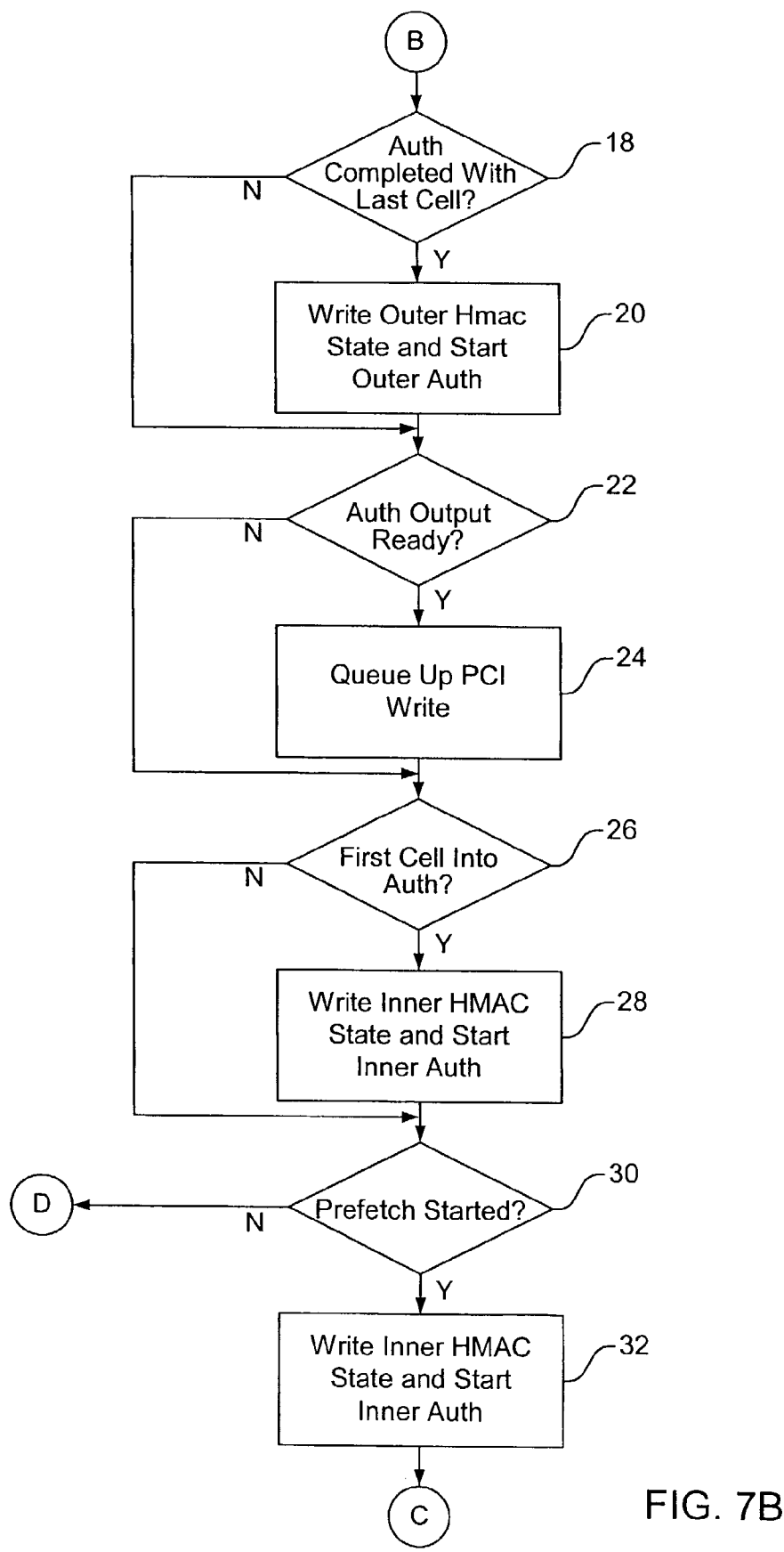
Figure 7C:
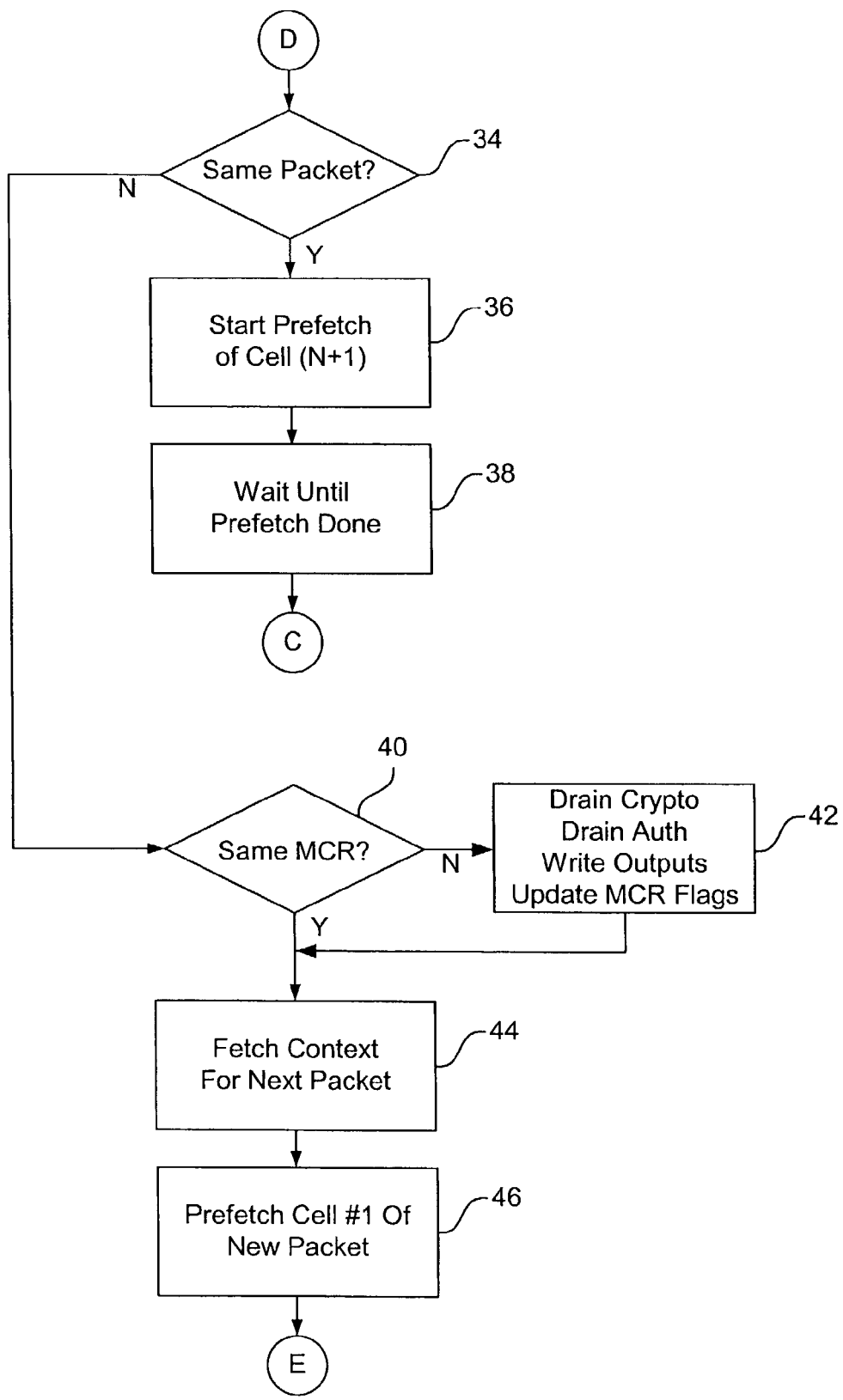
Figure 7D:
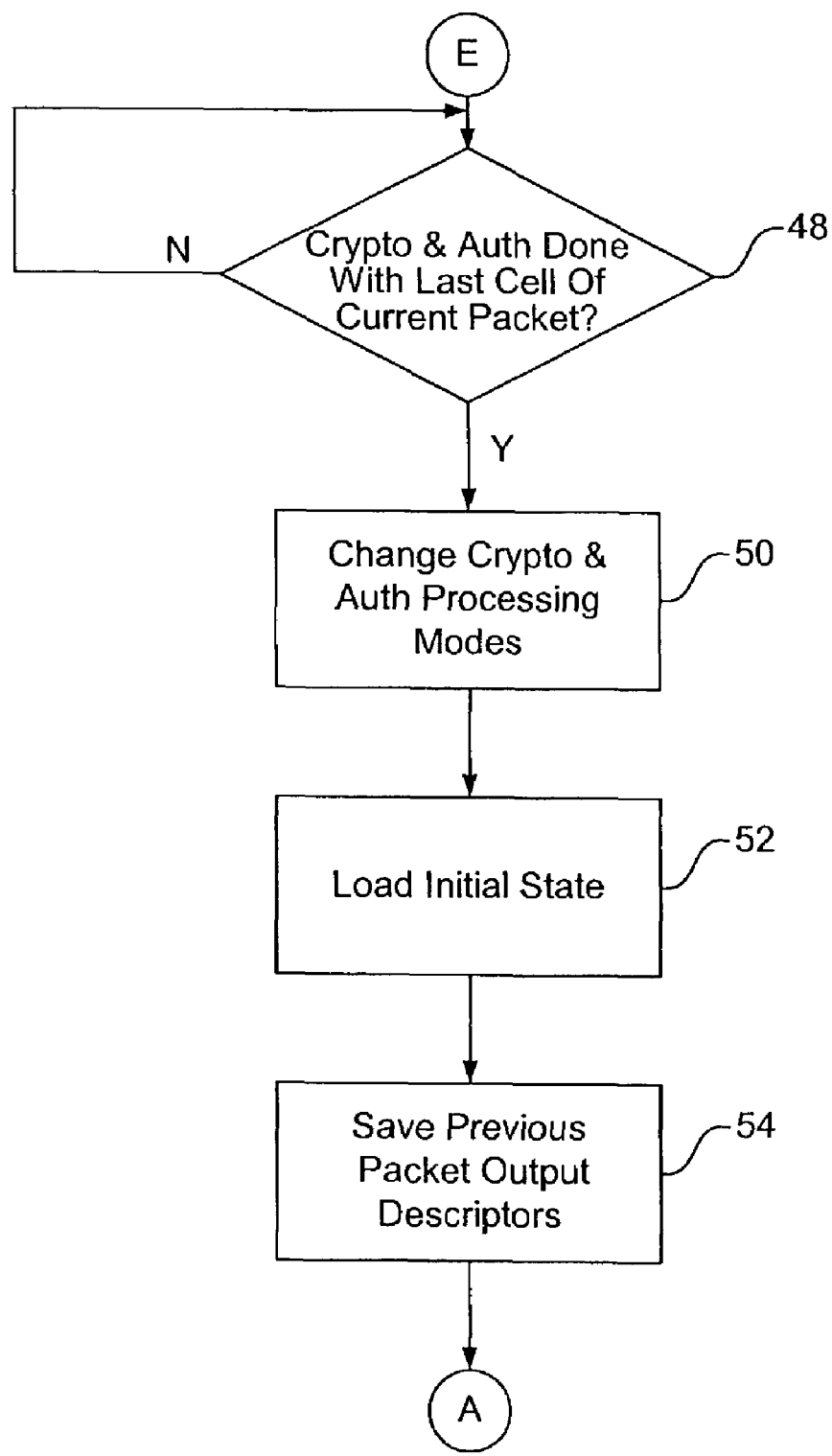

FIG. 6 illustrates a high-level view of packet processing according to the present invention. Note that multiple sets of input packets can be specified via a single command descriptor (i.e. a single PCI write). IPSec packets are processed in the following stages:

1. fetch the command context and data via descriptors
2. if a packet is inbound, authenticate then decrypt the cells in parallel fashion
3. if a packet is outbound, encrypt then authenticate the cells in pipelined fashion
4. write (via descriptors) the output data and authentication codes, if applicable The command, data descriptor, packet data and context data fetch phases are completely overlapped with the engine processing. Output packet data write-back is completely overlapped as well.

The processing sequence control for the first embodiment of the present invention will now be described in further detail with reference to FIGS. 7(A)–7(D). The processing has been designed to maximize the over-all chip throughput by pipelining the various functions. The procedure disclosed in FIGS. 7(A)–7(D) represents only one way of implementing the present invention and modifications to the disclosed procedure will be readily apparent to those skilled in the art. The additional processing methods necessary for implementing the second embodiment have been described above with reference to the public key processing steps.

The processing sequence control begins at step 2 by fetching a new cell (N). In other words, a new cell is pre-fetched and stored in a buffer and placed in the "pipeline." Once the previous cell (N−1) has completed processing at step 4, the new cell (N) is loaded into the 3DES crypto unit and the MD5/SHA1 authentication unit at step 6. If there are more than two outstanding PCI writes pending, the processing waits until only two or less PCI writes are left to perform (step 8). This ensures that the crypto engines do not outpace the ability of the PCI bus and system to handle the output. Depending on the system, the number of PCI writes that are pending can be adjusted to suit the performance issues of a particular system, interface and bus design.

The crypto processing and authentication processing are then performed in parallel at steps 10–16. First, the crypto processing is started for the current cell (N), at step 10, and then a PCI write is queued up at step 12 for the previous cell (N−1) that has just completed processing. Meanwhile, authentication processing is delayed if two PCI writes are pending (step 14). Then the authentication processing for the current cell (N) is started at step 16. If the authentication for the packet is now completed with the processing of the last cell (step 18), the outer HMAC state is written and the outer authentication processing started (step 20). As is known in the art, Hashed Message Authentication Codes (HMAC) use secret keys to prevent someone from changing the data and signing the packet. Since the authentication algorithms are known publicly, the HMAC codes are used to provide greater packet security.

If the authentication output is ready (step 22), a new PCI write is queued up at step 24. If, however, the current cell is the first cell into the authentication unit (step 26), an inner HMAC state is written and the inner authentication is started (step 28). If the pre-fetch of the next cell has started, then the inner HMAC state is written and the inner authentication started (step 32), otherwise processing jumps to "D" on FIG. 7(C). Following the inner HMAC write, process control returns to "C" on FIG. 7(A), beginning with step 4.

At step 34, a determination is made whether the next cell is part of the same packet as the current cell. If it is, the next cell (N+1) is pre-fetched (step 36), and once the pre-fetch has completed (step 38), the processing returns to "C" on FIG. 7(A). If however the next cell is not part of the current packet (i.e. the current packet has completed processing), a determination is made at step 40 whether the packets are part of the same Master Command Record (MCR). As discussed previously, the system may place multiple packets into a single MCR in order to reduce the system overhead, by enabling multiple packets to be processed via a single PCI write. If the packets are from the same MCR, then the context is fetched for the next packet (step 44). If the packets are from different MCRs, however, the crypto and authentication blocks are first drained, the outputs are written, and the MCR status flags are updated (step 42), before the context for the next packet is obtained.

The first cell of the new packet is pre-fetched at step 46. Once the crypto and authentication processing are finished for the last cell of the current packet (step 48), the crypto and authentication processing modes are changed (step 50), as dictated by the new context. The initial states are loaded (step 52), and the previous packet's output descriptors are then saved (step 54). Processing then returns to "A" on FIG. 7(A), and the entire procedure continues until there are no more packets to process.

Figure 8:
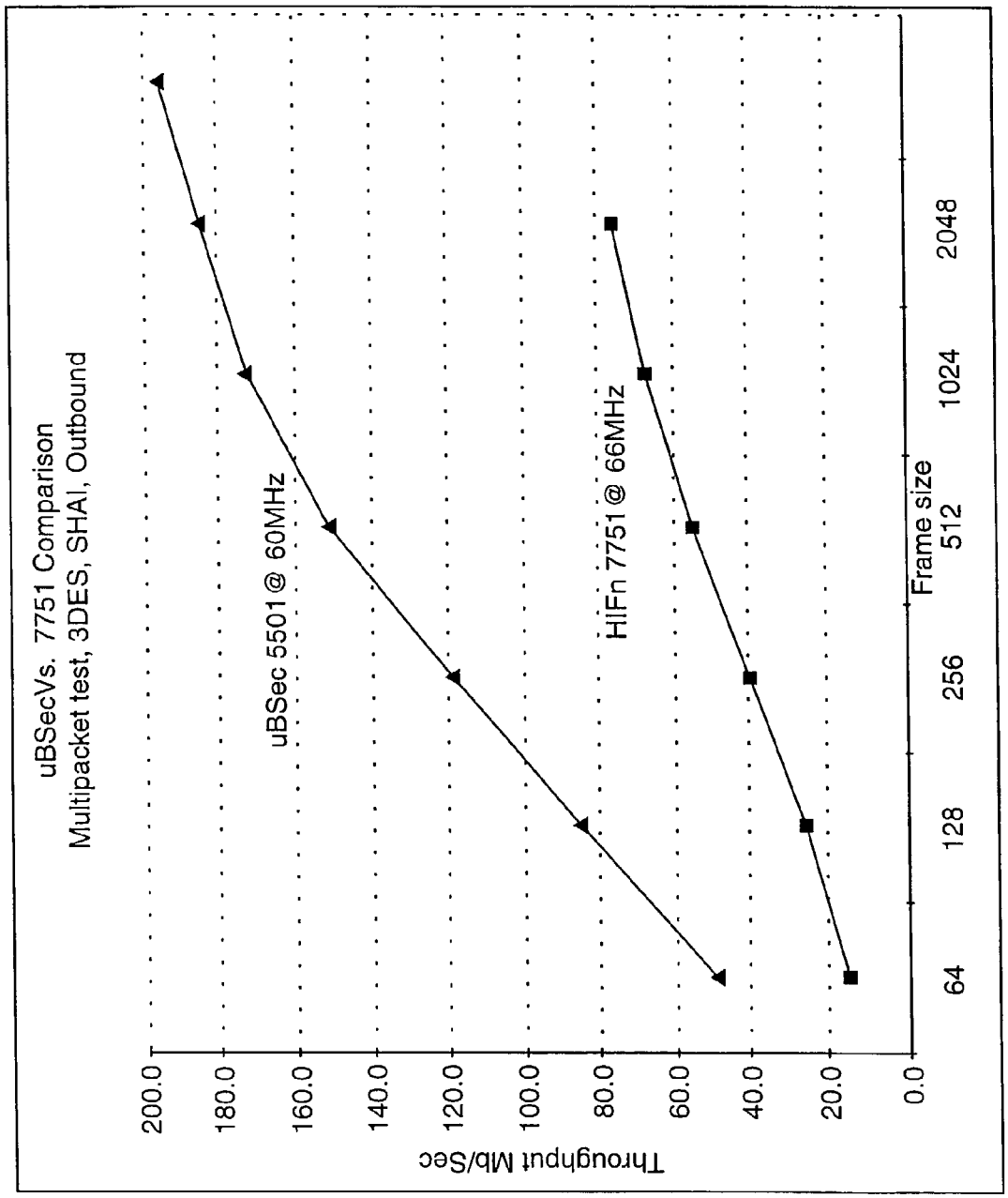
FIG. 8 is a graph comparing the performance of a cryptography accelerator chip configured according to the present invention with a prior-art cryptography accelerator chip.

As described, the processing sequence control is highly pipelined, with overlapping execution of various functions. The fact that the packets are split into fixed-sized cells allows for very efficient control sequence processing. Thus, the present invention provides greater throughput than prior art designs. As shown in FIG. 8, for example, the first embodiment of the present invention described above (uB-Sec™ 5501 @ 60 MHz), has much greater throughput than a comparable prior art design (Hi/fn™ 7751 @ 66 MHz). Not only is the present invention faster, it is able to obtain the performance increase without requiring any additional attached memory, as required by the Hi/fn™ chip.

Those skilled in the art will appreciate that various adaptations and modifications of the just-described preferred embodiments can be configured without departing from the scope and spirit of the invention. For example, other crypto engines may be used, different system interface configurations may be used, or modifications may be made to the cell processing procedure. Therefore, it is to be understood that, within the scope of the appended claims, the invention may be practiced other than as specifically described herein.

What is claimed is:

1. A method for cryptography processing of data packets, the method comprising:
   identifying a first fixed-sized cell at a cryptography accelerator, the first fixed-sized cell comprising one of a plurality of fixed-sized cells derived from a first packet;
   maintaining first context information corresponding to the first fixed-sized cell, the first context information identifying a first key and a first algorithm for cryptographically processing the first fixed-sized cell;
   identifying a second fixed-sized cell at a cryptography accelerator, the second fixed-sized cell comprising one of a plurality of fixed-sized cells derived from a second packet; and
   maintaining second context information associated with the second fixed-sized cell, the second context information identifying a second key and a second algorithm for cryptographically processing the second fixed-sized cell.

2. The method of claim 1, further comprising cryptographically processing the first and second fixed-sized cells using the first and second context information.

3. The method of claim 1, wherein the first and second packets are back-to-back packets.

4. The method of claim 1, further comprising recombining the first and second fixed-sized cell into first and second processed data packets.

5. A method for accelerating cryptography processing of data packets, the method comprising:
   splitting an unfixed-sized incoming packet into a plurality of fixed-sized cells;
   maintaining context information for the fixed-sized cells, wherein context information comprises key and algorithm information for cryptographically processing the fixed-sized cells;
   processing the fixed-sized cells using context information; and
   recombining the fixed-sized cells associated with the incoming packet into a processed data packet.

6. The method of claim 5, further comprising reading an incoming packet from a system memory before splitting the packet into fixed-sized cells.

7. The method of claim 6, further comprising writing the processed data packet out to the system memory.

8. The method of claim 7, further comprising storing the fixed-sized cells in a buffer.

9. The method of claim 8, further comprising pre-fetching context information associated with the incoming packet and storing the context information in an on-chip context buffer.

10. The method of claim 9, wherein processing comprises performing at least one cryptographic operation on the fixed-sized cells.

11. The method of claim 10, wherein the processing comprises performing 3DES-CBC encryption/decryption and MD authentication/digital signature processing on the fixed-sized cells.

12. The method of claim 11, wherein for in-bound packets, the cells are first authenticated and then decrypted in parallel fashion and for out-bound packets, the cells are first encrypted then authenticated, in pipelined fashion.

13. The method of claim 12, wherein the cryptographic processing operations are performed in parallel.

14. The method of claim 10, wherein the processing comprises Diffie-Hellman/RSA/DSA public key processing.

15. The method of claim 5, further comprising pre-fetching the context information.

16. A method for accelerating IPSec cryptography processing of IF packets, the method comprising:
   splitting an unfixed-sized incoming IP packet into a plurality of fixed-sized cells;
   placing the fixed-sized cells in a buffer;
   processing the fixed-sized cells with a 3DES-CBC encryption/decryption unit and an MD5/SHA1 authentication signature unit; and
   recombining the fixed-sized cells into a processed IP packet.

17. The method of claim 16, further comprising reading an incoming IP packet from a system memory before splitting the packet into fixed-sized cells.

18. The method of claim 16, further comprising writing the processed IP packet out to the system memory.

19. The method of claim 18, wherein the buffer size is less than 512 kilobytes.

20. The method of claim 19, further comprising pre-fetching context information associated with the incoming packet and storing the context information in a context buffer.

21. The method of claim 20, wherein for in-bound packets, the cells are first authenticated and then decrypted in parallel fashion and for out-bound packets, the cells are first encrypted then authenticated, in pipelined fashion.

22. The method of claim 21, wherein the cryptographic processing operations are performed in parallel.

23. The method of claim 22, wherein multiple packets are combined into a single record and are sent for processing by a system controller with a single bus write command.

24. A method for sequencing fixed-sized cells in a cryptography acceleration chip, wherein incoming data packets are split into fixed-sized cells, the method comprising:
   pre-fetching a next cell for processing;
   waiting until a previous cell has finished processing;
   loading the next cell into a cryptography processing unit such that the next cell comprises a current cell for cryptography processing;
   waiting until less than a predetermined number of system bus writes are pending before starting the cryptography processing on the current cell and queuing up a write for the previous cell.

25. The method of claim 24, wherein the cryptography processing comprises performing both encryption/decryption and authentication in parallel.

26. The method of claim 25, further comprising writing an outer HMAC code, if the current cell is the last cell to be authenticated in a current packet.

27. The method of claim 26, further comprising writing an inner HMAC code, if the current cell is the first cell in a new packet.

28. The method of claim 27, further comprising pre-fetching a next cell, if the next cell is from a same packet as a current cell, otherwise, determining if a new packet is part of a same Master Command Record (MCR) as the current packet.

29. The method of claim 28, further comprising pre-fetching a new context and a new cell, if the new packet is part of the same MCR as the current packet, otherwise, draining the cryptography processing blocks, writing an output, updating status MCR status information, and then pre-fetching a new context and a new cell.

30. The method of claim 29, wherein the encryption/decryption is performed by a 3DES-CBC unit and the authentication is performed by a MD5/SHA1 unit in order to implement IPSec processing.

* * * * *

UNITED STATES PATENT AND TRADEMARK OFFICE
CERTIFICATE OF CORRECTION

| | | |
|---|---|---|
| PATENT NO. | : 6,971,006 B2 | Page 1 of 1 |
| APPLICATION NO. | : 10/227491 | |
| DATED | : November 29, 2005 | |
| INVENTOR(S) | : Krishna et al. | |

It is certified that error appears in the above-identified patent and that said Letters Patent is hereby corrected as shown below:

Claim 16
Column 10, line 53, "IF packets" should be changed to --IP packets--.

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 6,971,006 B2 Page 1 of 1
APPLICATION NO. : 10/227491
DATED : November 29, 2005
INVENTOR(S) : Krishna et al.

It is certified that error appears in the above-identified patent and that said Letters Patent is hereby corrected as shown below:

Title page of patent in item (63), "6,477,645" should be changed to --6,477,646--.

In column 1, line 9, "6,477,645" should be changed to --6,477,646--.

Signed and Sealed this

Thirteenth Day of May, 2008

JON W. DUDAS
*Director of the United States Patent and Trademark Office*